(12) United States Patent
Tsai et al.

(10) Patent No.: US 11,422,647 B2
(45) Date of Patent: Aug. 23, 2022

(54) METHOD OF PRODUCING STACKING STRUCTURE, STACKING STRUCTURE AND TOUCH SENSOR

(71) Applicant: Cambrios Film Solutions Corporation, Tortola (VG)

(72) Inventors: Yi-Chen Tsai, Chiayi (TW); Wei-Chia Fang, Zhubei (TW); Chun-Hung Chu, Hsinchu (TW); Chung-Chin Hsiao, Zhubei (TW); Meng-Yun Wu, Luodong Township, Yilan County (TW); Tsu-Hsuan Lai, New Taipei (TW); Wei-Cheng Hsu, New Taipei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 17/016,774

(22) Filed: Sep. 10, 2020

(65) Prior Publication Data

US 2022/0075463 A1 Mar. 10, 2022

(51) Int. Cl.
*G06F 3/041* (2006.01)
(52) U.S. Cl.
CPC .... *G06F 3/041* (2013.01); *G06F 2203/04102* (2013.01); *G06F 2203/04103* (2013.01)
(58) Field of Classification Search
CPC ........... G06F 3/041; G06F 2203/04102; G06F 2203/04103; G06F 3/044; G06F 2203/00; G06F 2203/04112; G06F 3/0446
See application file for complete search history.

(56) References Cited

U.S. PATENT DOCUMENTS

| | | | | |
|---|---|---|---|---|
| 2012/0200516 A1* | 8/2012 | Kim | ......................... | G06F 3/045 345/173 |
| 2014/0362036 A1* | 12/2014 | Mo | ......................... | G06F 3/044 345/174 |
| 2016/0026293 A1* | 1/2016 | Kim | ......................... | G06F 3/0443 345/173 |
| 2019/0278406 A1* | 9/2019 | Yang | ......................... | G06F 3/047 |
| 2019/0371830 A1* | 12/2019 | Hsiao | ................... | H01L 27/1259 |
| 2020/0081563 A1* | 3/2020 | Wang | ...................... | G06F 3/041 |

* cited by examiner

*Primary Examiner* — Md Saiful A Siddiqui
(74) *Attorney, Agent, or Firm* — Cooper Legal Group, LLC

(57) ABSTRACT

A method of producing a stacking structure includes providing a substrate; printing, by flexography, a catalyst layer onto the substrate, wherein the catalyst layer includes a grid pattern and a conducting wire pattern connected to the grid pattern; plating, by chemical plating, a metal layer onto the catalyst layer, wherein the metal layer includes a metal grid corresponding in position to the grid pattern of the catalyst layer and a metal conducting wire corresponding in position to the conducting wire pattern of the catalyst layer; and printing, by flexography, a silver nanowire layer onto the metal layer, wherein the silver nanowire layer at least partially overlaps the metal grid. A stacking structure includes a substrate; a catalyst layer; a metal layer; and a silver nanowire layer. The method of producing a stacking structure and the stacking structure are applicable to a touch sensor.

19 Claims, 8 Drawing Sheets

A-A

METHOD OF PRODUCING STACKING STRUCTURE, STACKING STRUCTURE AND TOUCH SENSOR

BACKGROUND

1. Field of the Disclosure

The present disclosure relates to methods of producing a stacking structure, and in particular to a method of producing a stacking structure by flexography. The present disclosure further relates to stacking structures, and in particular to a stacking structure including a metal layer with a metal grid. The present disclosure further relates to touch sensors, and in particular to a touch sensor including the stacking structure.

2. Description of the Related Art

A stacking structure inclusive of a silver nanowire and metal layer is applicable to a touch sensor. The conventional method of producing a stacking structure involves performing a one-time etching process by lithography in the presence of copper and nanosilver to define a trace area TA and a visible area VA. The conventional stacking structure thus produced by the prior art is shown in FIG. 1, FIG. 2 and FIG. 3. Referring to FIG. 1 and FIG. 2, a conventional stacking structure 10 includes: a substrate 11; a metal layer 13 disposed on the substrate 11, wherein the metal layer 13 includes a metal sheet 131 and a metal conducting wire 132; and a silver nanowire layer 14 disposed on the metal layer 13. In another embodiment illustrated by FIG. 3, the conventional stacking structure 10 further includes a catalyst layer 12 disposed between the substrate 11 and the metal layer 13. The conventional stacking structure includes: a trace area TA, including the metal conducting wire 132; a first lap-over area 15, including an area defined in the metal sheet 131 and positioned proximate to the metal conducting wire 132; a second lap-over area 16, including an area defined in the metal sheet 131 and positioned distal to the metal conducting wire 132; and a visible area VA, including an area positioned proximate to one edge of the metal sheet 131, covered with the silver nanowire layer 14, but not covered with the metal sheet 131.

In the stacking structure formed by the conventional method of producing a stacking structure, both the first lap-over area 15 and the second lap-over area 16 are made of solid copper with a whole (i.e., uniform or continuous) surface, and the production process is intricate and expensive. Therefore, it is necessary to provide a novel method of producing a stacking structure, the stacking structure, and a touch sensor.

BRIEF SUMMARY

An objective of the present disclosure is to provide a novel method of producing a stacking structure, the stacking structure and a touch sensor with a view to overcoming drawbacks of the prior art (i.e., the conventional method of producing a stacking structure process being intricate and expensive).

To achieve at least the above objective, the present disclosure provides a method of producing a stacking structure, including:

providing a substrate;

printing, by flexography, a catalyst layer onto the substrate, wherein the catalyst layer includes a grid pattern and a conducting wire pattern connected to the grid pattern;

plating, by chemical plating, a metal layer onto the catalyst layer, wherein the metal layer includes a metal grid corresponding in position to the grid pattern of the catalyst layer and a metal conducting wire corresponding in position to the conducting wire pattern of the catalyst layer; and printing, by flexography, a silver nanowire layer onto the metal layer, wherein the silver nanowire layer at least partially overlaps the metal grid.

Regarding the method, the catalyst layer may include catalytic metal wires, metal particles, metal ions, and/or metal sheets.

Regarding the method, the catalyst layer may include a non-conductive material, such as acrylate and/or epoxy resin, or includes any other polymer, such as hydroxypropyl methylcellulose (HPMC), hydroxypropyl cellulose (HPC), methylcellulose, ethyl cellulose, xanthan gum, polyvinyl alcohol, polyvinylpyrrolidone (PVP), carboxy methyl cellulose, and hydroxyethyl cellulose, so as to form the catalyst layer which is conductive or non-conductive.

Regarding the method, the metal layer may be include copper, copper-nickel alloy, copper-lead alloy, silver, silver-nickel alloy, and/or silver-lead alloy.

Regarding the method, the substrate may include polyethylene terephthalate (PET), cyclic olefin copolymer (COP), colorless polyimide (CPI), polyethylene naphthalate (PEN), polycarbonate (PC), and/or polyethersulfone (PES).

Regarding the method, the silver nanowire layer may be of a thickness greater than 0.3 μm.

Regarding the method, transmittance (T %) of an overlap part of the silver nanowire layer and the metal grid may be less than 90%.

To achieve at least the above objective, the present disclosure further provides a stacking structure, including:

a substrate;

a catalyst layer disposed on the substrate, wherein the catalyst layer includes a grid pattern and a conducting wire pattern connected to the grid pattern;

a metal layer disposed on the catalyst layer, wherein the metal layer includes a metal grid correspondingly disposed on the grid pattern of the catalyst layer and a metal conducting wire correspondingly disposed on the conducting wire pattern of the catalyst layer; and a silver nanowire layer disposed on the metal layer, wherein the silver nanowire layer at least partially overlaps the metal grid.

Regarding the stacking structure, the catalyst layer includes catalytic metal wires, metal particles, metal ions, and/or metal sheets.

Regarding the stacking structure, the catalyst layer includes acrylate and/or epoxy resin.

Regarding the stacking structure, the metal layer includes copper, copper-nickel alloy, copper-lead alloy, silver, silver-nickel alloy, and/or silver-lead alloy.

Regarding the stacking structure, the substrate includes polyethylene terephthalate (PET), cyclic olefin copolymer (COP), colorless polyimide (CPI), polyethylene naphthalate (PEN), polycarbonate (PC), and/or polyethersulfone (PES).

Regarding the stacking structure, the silver nanowire layer has a thickness greater than 0.3 μm.

Regarding the stacking structure, transmittance (T %) of an overlap part of the silver nanowire layer and the metal grid is less than 90%.

Regarding the stacking structure, the stacking structure includes: a trace area in which the metal conducting wire is disposed; a first lap-over area, including an area defined in the metal grid but not covered with the silver nanowire layer; a second lap-over area, including an opaque region defined in the metal grid and covered with the silver nanowire layer and a transparent region positioned proximate to two opposing edges of the metal grid, covered with the silver nanowire layer, but not covered with the metal grid; and a visible area, including an area positioned proximate to an edge of the metal grid, covered with the silver nanowire layer, but not covered with the metal grid.

Regarding the stacking structure, the transparent region accounts for a smaller proportion of the second lap-over area than the opaque region, and the transparent region accounts for less than 50% of an overlap part of the silver nanowire layer and the metal grid.

Regarding the stacking structure, the total width of the first lap-over area and the second lap-over area is less than 500 µm, and the ratio of the width of the first lap-over area to the width of the second lap-over area falls in the range of 0.1-10.

Regarding the stacking structure, the total width of the first lap-over area and the second lap-over area falls in the range of 0.5 mm-1.0 mm, and the ratio of the width of the first lap-over area to the width of the second lap-over area falls in the range of 0.05-20.

Regarding the stacking structure, the total width of the first lap-over area and the second lap-over area falls in the range of 1.0 mm-1.5 mm, and the ratio of the width of the first lap-over area to the width of the second lap-over area falls in the range of 0.03-30.

Regarding the stacking structure, the total width of the first lap-over area and the second lap-over area falls in the range of 1.5 mm-2.5 mm, and the ratio of the width of the first lap-over area to the width of the second lap-over area falls in the range of 0.02-50.

Regarding the stacking structure, in the first lap-over area, the pitch of the metal grid is 0.1-10 times the pitch of the metal conducting wire.

Regarding the stacking structure, the metal conducting wire has pitch of 20 µm, line width of 10 µm, and line spacing of 10 µm, and the pitch of the metal grid in the first lap-over area falls in the range of 2 µm-200 µm.

Regarding the stacking structure, the first lap-over area has line width of 2 µm-50 µm and line spacing of 2 µm-10 µm.

Regarding the stacking structure, in the first lap-over area, the metal grid has line width/line spacing of 40 µm/10 µm, 30 µm/10 µm, 20 µm/10 µm or 10 µm/10 µm.

Regarding the stacking structure, the metal conducting wire has line width of 3 µm-30 µm and line spacing of 3 µm-30 µm.

The stacking structure further includes:
a bonding pad disposed on the substrate, including:
  a bonding catalyst layer disposed on the substrate, wherein the bonding catalyst layer includes a bonding grid pattern; and
  a bonding metal layer disposed on the bonding catalyst layer, wherein the bonding metal layer includes a bonding metal grid correspondingly disposed on the bonding grid pattern of the bonding catalyst layer.

To achieve at least the above objective, the present disclosure further provides a touch sensor, including:
the stacking structure; and
a covering layer disposed on the silver nanowire layer of the stacking structure.

The touch sensor, further includes:
a second catalyst layer disposed below the substrate in the stacking structure, wherein the second catalyst layer includes a second grid pattern and a second conducting wire pattern connected to the second grid pattern;
a second metal layer disposed below the second catalyst layer, wherein the second metal layer includes a second metal grid correspondingly disposed below the second grid pattern of the second catalyst layer and a second metal conducting wire correspondingly disposed below the second conducting wire pattern of the second catalyst layer;
a second silver nanowire layer disposed below the second metal layer, wherein the second silver nanowire layer at least partially overlaps the second metal grid; and
a second covering layer disposed below the second silver nanowire layer.

Therefore, the method of producing a stacking structure simplifies the stacking structure production process and reduces the production cost of the stacking structure and a touch sensor including the stacking structure.

According to the present disclosure, the stacking structure and the touch sensor including the stacking structure save metal raw materials and reduce the production cost of the stacking structure and the touch sensor including the stacking structure.

DETAILED DESCRIPTION OF THE INVENTION

The implementation of the present invention is illustrated by the specific embodiments as follows, so one skilled in the art may understand other advantages and effects of the present invention by the contents disclosed in the specification. The present invention may also be implemented or applied by other embodiments, and the details in the specification may also be based on different views and applications without departing from the spirit of the present invention for various modifications and variations.

Unless otherwise specified, the singular determiner "a", "an" and "the" used hereunder may also be interpreted to mean plurality.

Unless otherwise specified, the conjunction "or" used hereunder may also be interpreted to mean "and/or".

Figure 8:
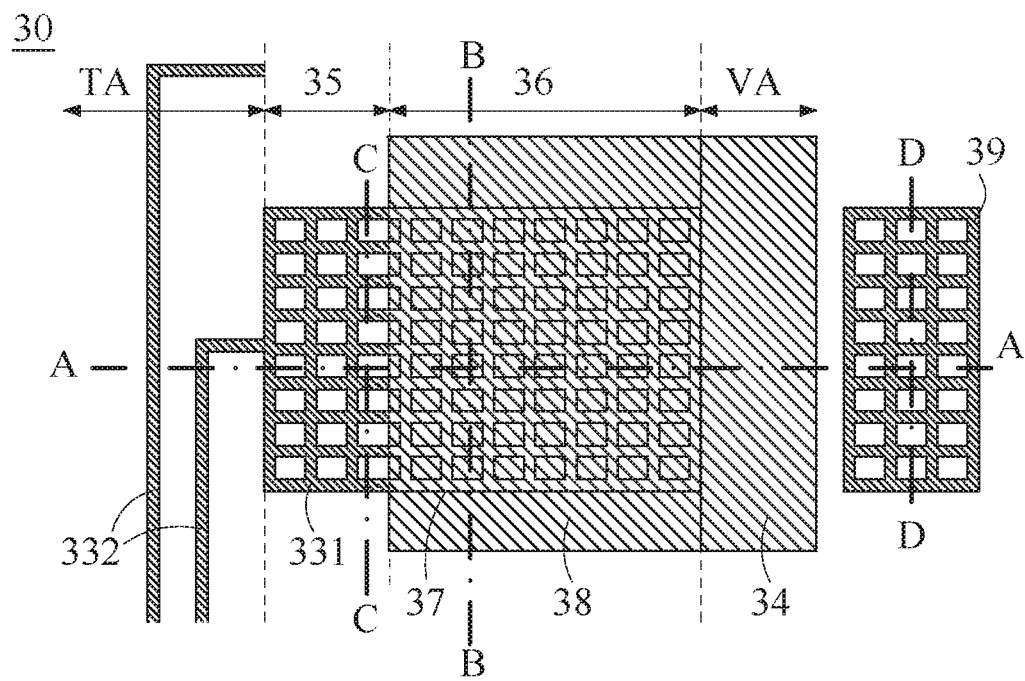
FIG. 8 is a schematic view of the stacking structure according to embodiment 3 of the present disclosure.
Figure 9:
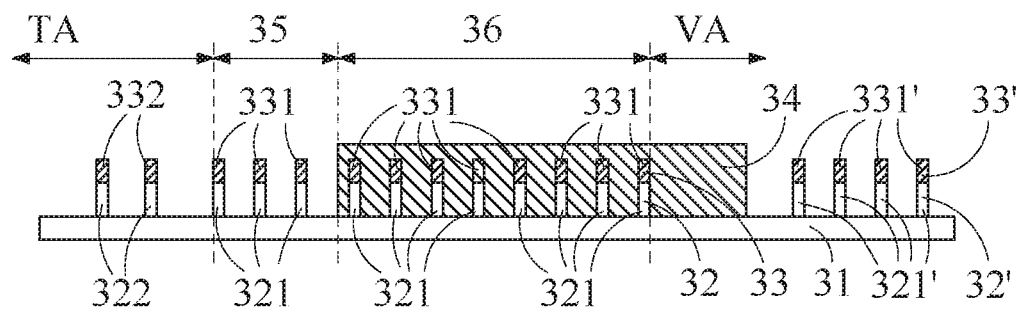
FIG. 9 is a cross-sectional view of the stacking structure taken along line A-A according to embodiment 3 of the present disclosure.
Figure 10:
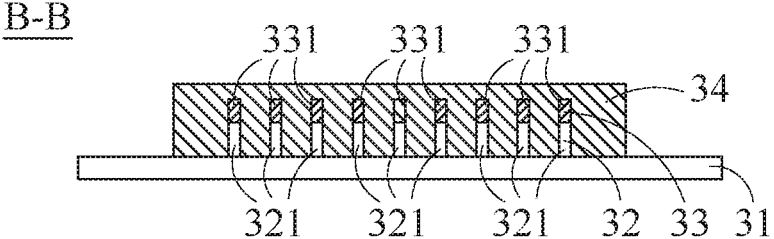
FIG. 10 is a cross-sectional view of the stacking structure taken along line B-B according to embodiment 3 of the present disclosure.
Figure 11:
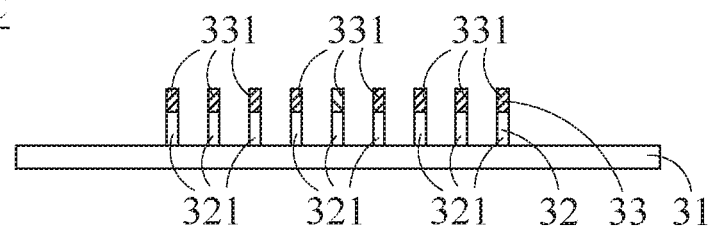
FIG. 11 is a cross-sectional view of the stacking structure taken along line C-C according to embodiment 3 of the present disclosure.
Figure 12:
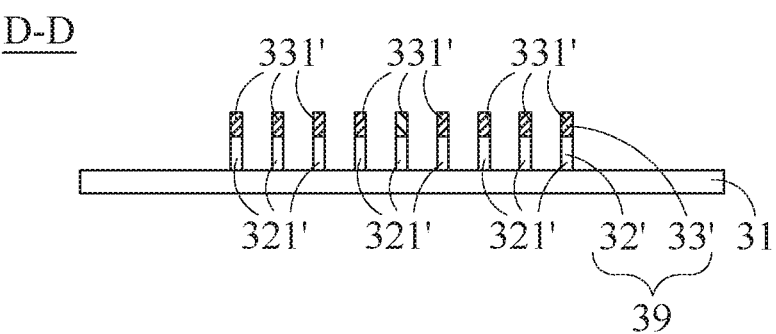
FIG. 12 is a cross-sectional view of the stacking structure taken along line D-D according to embodiment 3 of the present disclosure.

The "width" of the first lap-over area and second lap-over area disclosed hereunder refers to the width of the cross sections of the first lap-over area and second lap-over area taken along line A-A of FIG. 8.

The term "pitch" used hereunder refers to the shortest distance between the central axis of a metal conducting wire and the central axis of another adjacent metal conducting wire or refers to the shortest distance between the central axis of a metal line and the central axis of another adjacent metal line in a metal grid.

The term "line spacing" used hereunder refers to the shortest distance between the edge of a metal conducting wire and the edge of another adjacent metal conducting wire or refers to the shortest distance between the edge of a metal line in a metal grid and the edge of another adjacent metal line in the metal grid.

Embodiment 1

Figure 1:
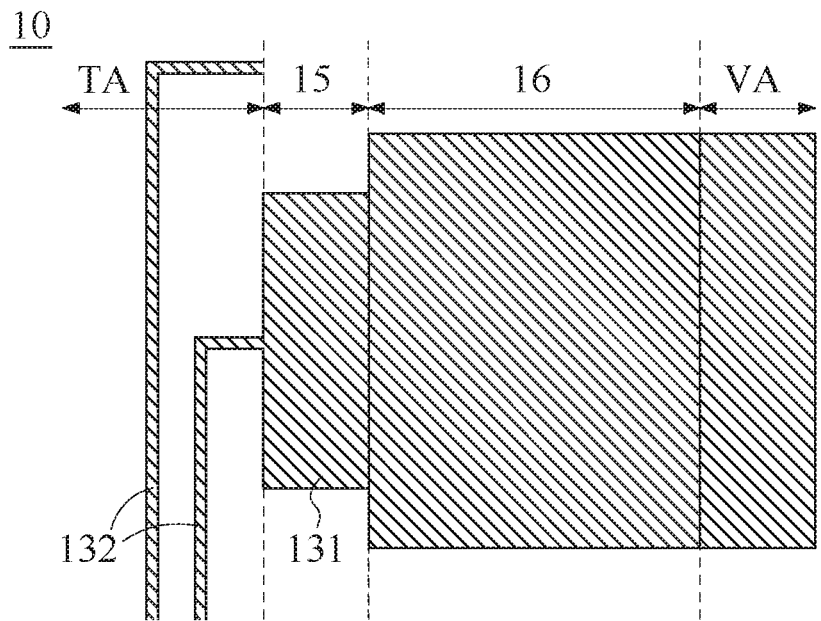
FIG. 1 is a schematic view of a conventional stacking structure.
Figure 2:
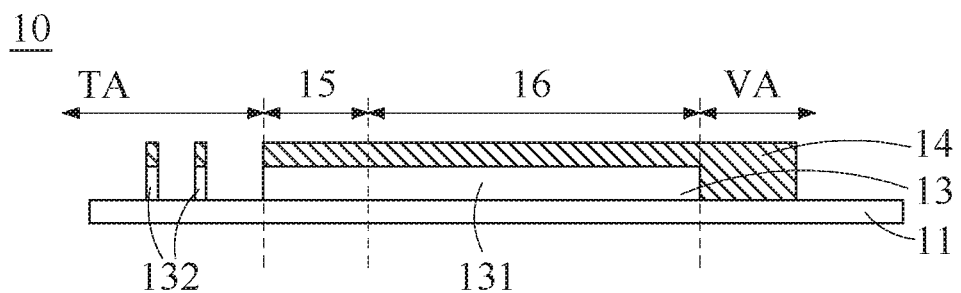
FIG. 2 is a cross-sectional view of the conventional stacking structure.
Figure 3:
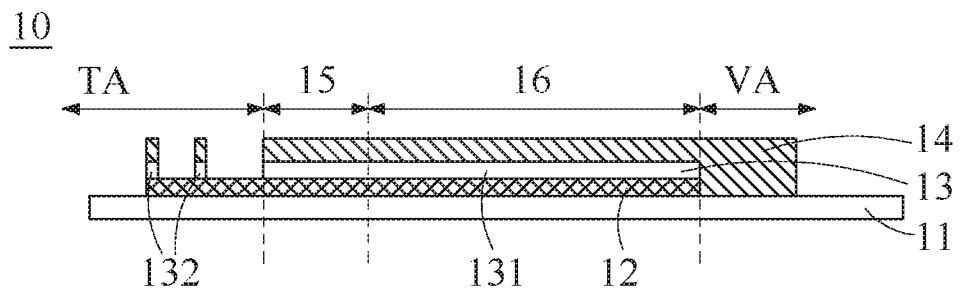
FIG. 3 is a cross-sectional view of another embodiment of the conventional stacking structure.
Figure 4:
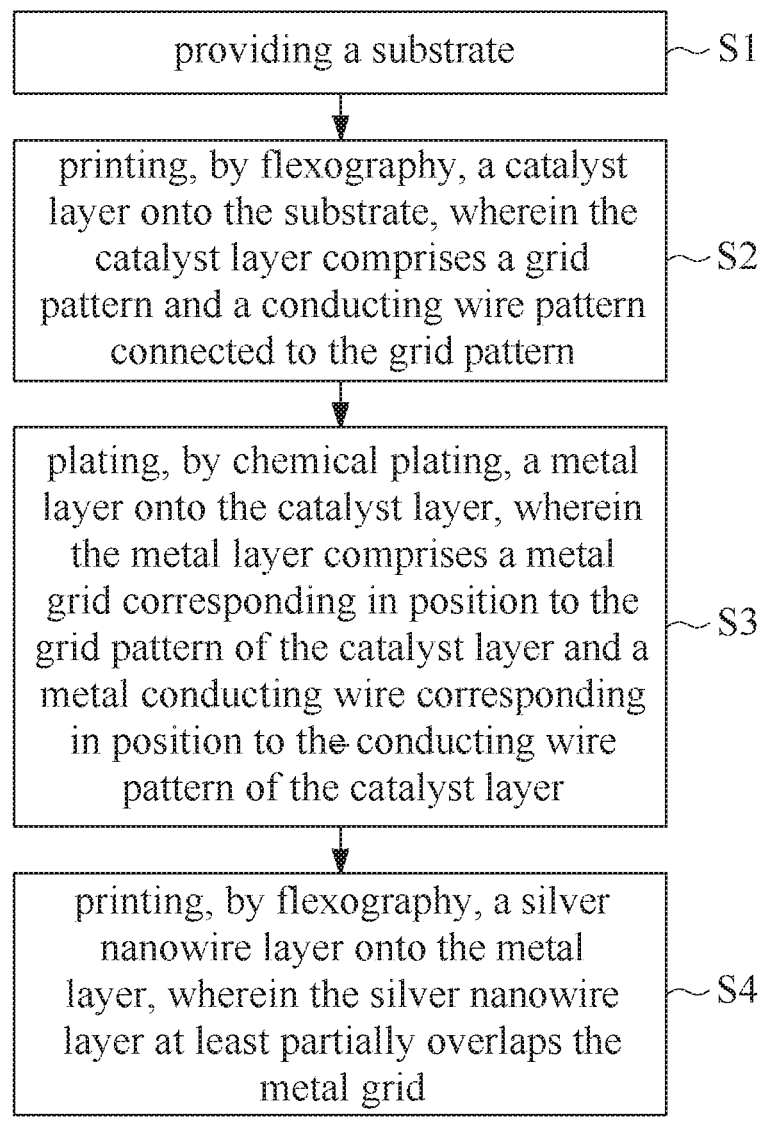
FIG. 4 is a flowchart of a method of producing a stacking structure according to the present disclosure.

FIG. 4 is a flowchart of a method 1 of producing a stacking structure according to embodiment 1 of the present disclosure. As shown in FIG. 4, the method 1 includes the steps of: providing a substrate S1; printing, by flexography, a catalyst layer onto the substrate, wherein the catalyst layer includes a grid pattern and a conducting wire pattern connected to the grid pattern S2; plating, by chemical plating, a metal layer onto the catalyst layer, wherein the metal layer includes a metal grid corresponding in position to the grid pattern of the catalyst layer and a metal conducting wire corresponding in position to the conducting wire pattern of the catalyst layer S3; and printing, by flexography, a silver nanowire layer onto the metal layer, wherein the silver nanowire layer at least partially overlaps the metal grid S4.

This embodiment is not restrictive of the material which the substrate is made of in step S1. For instance, an appropriate material includes, but is not limited to, polyethylene terephthalate (PET), cyclic olefin copolymer (COP), colorless polyimide (CPI), polyethylene naphthalate (PEN), polycarbonate (PC), and/or polyethersulfone (PES).

In this embodiment, step S2 involves printing a catalyst layer onto the substrate by conventional flexography. This embodiment is not restrictive of the constituents of the catalyst layer, provided that it is feasible to plate a metal layer onto the catalyst layer by chemical plating in step S3. For instance, the catalyst layer includes, but is not limited to, catalytic metal wires, metal particles, metal ions, and/or metal sheets. The catalyst layer includes, but is not limited to, acrylate and/or epoxy resin.

In this embodiment, step S3 involves plating a metal layer onto the catalyst layer by conventional chemical plating. This embodiment is not restrictive of the constituents of the metal layer, provided that the metal layer attains appropriate electrical conductivity. For instance, the metal layer includes, but is not limited to, copper, copper-nickel alloy, copper-lead alloy, silver, silver-nickel alloy and/or silver-lead alloy.

In this embodiment, step S4 involves printing a silver nanowire layer onto the metal layer by conventional flexography. This embodiment is not restrictive of the thickness of the silver nanowire layer, provided that the silver nanowire layer attains appropriate electrical conductivity. For instance, the silver nanowire layer has a thickness greater than 0.3 μm.

In this embodiment, the catalyst layer in step S2 includes a grid pattern and a conducting wire pattern connected to the grid pattern, such that the metal layer in step S3 includes a metal grid corresponding in position to the grid pattern of the catalyst layer and a metal conducting wire corresponding in position to the conducting wire pattern of the catalyst layer, whereas the silver nanowire layer in step S4 at least partially overlaps the metal grid. Therefore, the stacking structure produced by the method in this embodiment has the structure described in embodiment 2 and thus is applicable to the touch sensor.

In an embodiment of the stacking structure, transmittance (T %) of the overlap part of the silver nanowire layer and the metal grid to visible light (having a wavelength between 400 nm and 700 nm) is less than 90%.

Figure 5:
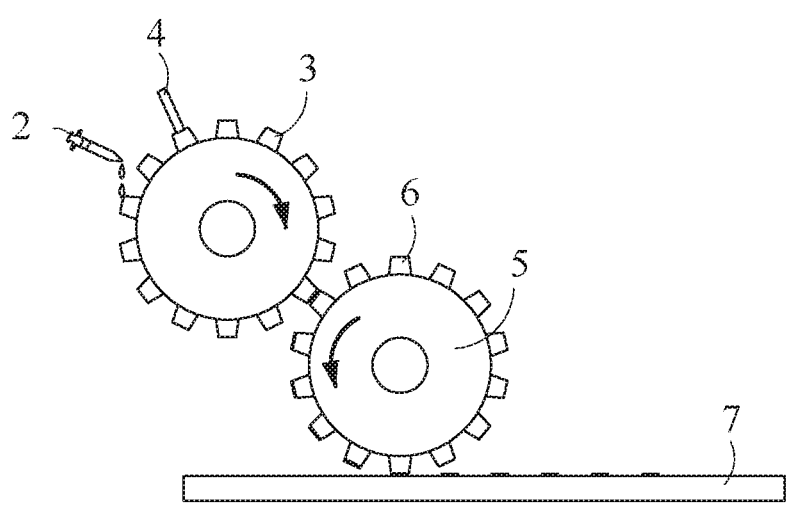
FIG. 5 is a schematic view of flexography.

FIG. 5 is a schematic view which illustrates the flexography for use in step S2 and step S4 according to an illustrative embodiment of the present disclosure, but the present disclosure is not limited thereto. Referring to FIG. 5, for example, flexography involves applying ink to an anilox roller 3 drop by drop with an ink dispenser 2, and then scraping residual ink off the anilox roller 3 with a doctor blade 4. After that, the ink on the anilox roller 3 is transferred to a flexo plate 6 on a plate cylinder 5. Finally, the ink on the flexo plate 6 is transferred to a printed matter 7, so as to print a required pattern on the printed matter 7.

Embodiment 2

Figure 6:
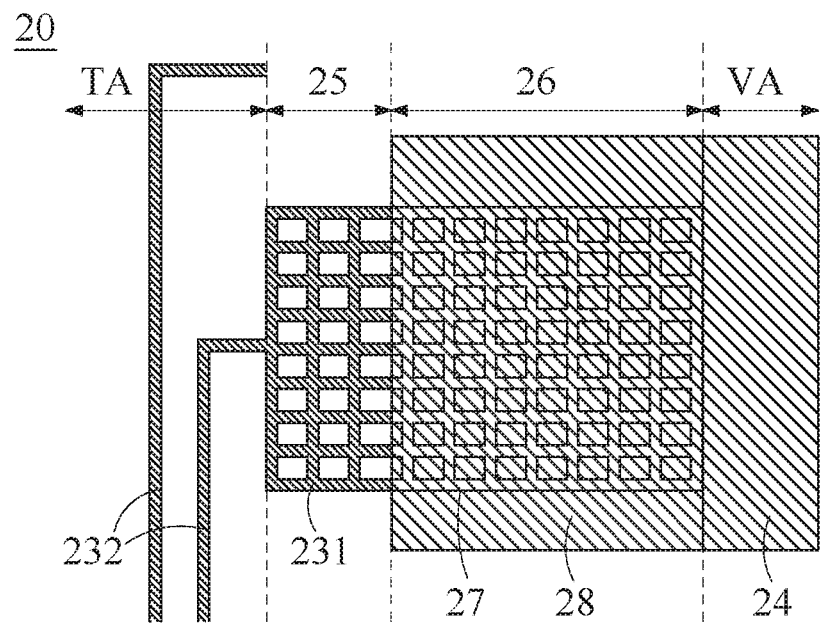
FIG. 6 is a schematic view of the stacking structure according to embodiment 2 of the present disclosure.
Figure 7:
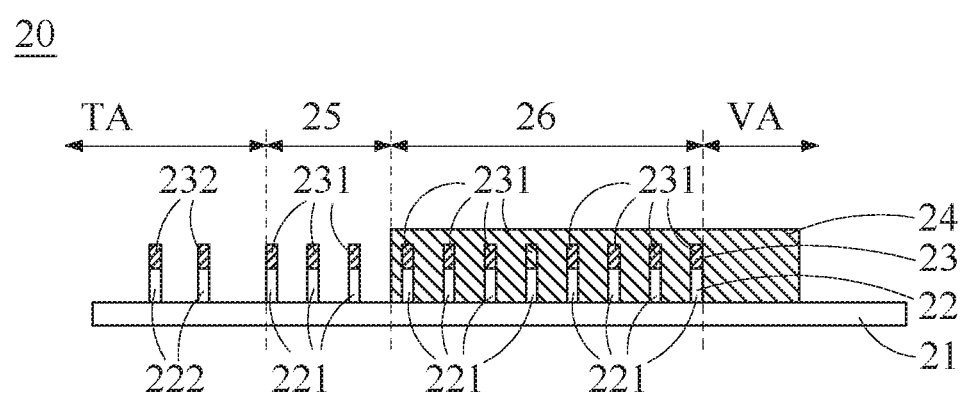
FIG. 7 is a cross-sectional view of the stacking structure according to embodiment 2 of the present disclosure.

FIG. 6 and FIG. 7 are schematic views of the stacking structure according to embodiment 2 of the present disclosure. As shown in FIG. 6 and FIG. 7, a stacking structure 20 of this embodiment includes: a substrate 21 (not shown in FIG. 6); a catalyst layer 22 (not shown in FIG. 6) disposed on the substrate 21, wherein the catalyst layer 22 includes a grid pattern 221 and a conducting wire pattern 222 connected to the grid pattern 221; a metal layer 23 disposed on the catalyst layer 22, wherein the metal layer 23 includes a metal grid 231 correspondingly disposed on the grid pattern 221 of the catalyst layer 22 and a metal conducting wire 232 correspondingly disposed on the conducting wire pattern 222 of the catalyst layer 22; and a silver nanowire layer 24 disposed on the metal layer 23, wherein the silver nanowire layer 24 at least partially overlaps the metal grid 231.

The stacking structure 20 of this embodiment includes: a trace area TA in which the metal conducting wire 232 is disposed; a first lap-over area 25, including an area defined in the metal grid 231 but not covered with the silver nanowire layer 24; a second lap-over area 26, including an opaque region 27 defined in the metal grid 231 and covered with the silver nanowire layer 24 and a transparent region 28 positioned proximate to two opposing edges of the metal grid 231, covered with the silver nanowire layer 24, but not covered with the metal grid 231; and a visible area VA, including an area positioned proximate to one edge of the metal grid 231, covered with the silver nanowire layer 24, but not covered with the metal grid 231.

The substrate 21 in the stacking structure 20 of this embodiment is made of a material, including, but not limited to, polyethylene terephthalate (PET), cyclic olefin copolymer (COP), colorless polyimide (CPI), polyethylene naphthalate (PEN), polycarbonate (PC), and/or polyethersulfone (PES).

This embodiment is not restrictive of the constituents of the catalyst layer 22 in the stacking structure 20, provided that it is feasible for the catalyst layer 22 to be plated with the metal layer 23 by chemical plating. For instance, the catalyst layer 22 includes, but is not limited to, catalytic metal wires, metal particles, metal ions, and/or metal sheets. The catalyst layer 22 includes, but is not limited to, acrylate and/or epoxy resin.

This embodiment is not restrictive of the constituents of the metal layer 23 in the stacking structure 20, provided that the metal layer 23 attains appropriate electrical conductivity. For instance, the metal layer 23 includes, but is not limited to, copper, copper-nickel alloy, copper-lead alloy, silver, silver-nickel alloy and/or silver-lead alloy.

This embodiment is not restrictive of the thickness of the silver nanowire layer 24 in the stacking structure 20, provided that the silver nanowire layer 24 attains appropriate electrical conductivity. For instance, the silver nanowire layer 24 has a thickness greater than 0.3 μm.

In an embodiment of the stacking structure 20, transmittance (T %) of the overlap part of the silver nanowire layer 24 and the metal grid 231 to visible light is less than 90%.

In an embodiment of the stacking structure 20, the transparent region 28 accounts for a smaller proportion of the second lap-over area 26 than the opaque region 27. In an embodiment of the stacking structure 20, the transparent region 28 accounts for less than 50% of the overlap part of the silver nanowire layer 24 and the metal grid 231.

In an embodiment of the stacking structure 20, the total width of the first lap-over area 25 and the second lap-over area 26 is less than 500 μm, and the ratio of the width of the first lap-over area 25 (measured from the trace area TA to the second lap-over area 26) to the width of the second lap-over area 26 (measured from the first lap-over area 25 to the visible area VA) falls in the range of 0.1-10.

In an embodiment of the stacking structure 20, the total width of the first lap-over area 25 and the second lap-over area 26 falls in the range of 0.5 mm-1.0 mm, and the ratio of the width of the first lap-over area 25 to the width of the second lap-over area 26 falls in the range of 0.05-20.

In an embodiment of the stacking structure 20, the total width of the first lap-over area 25 and the second lap-over area 26 falls in the range of 1.0 mm-1.5 mm, and the ratio of the width of the first lap-over area 25 to the width of the second lap-over area 26 falls in the range of 0.03-30.

In an embodiment of the stacking structure 20, the total width of the first lap-over area 25 and the second lap-over area 26 falls in the range of 1.5 mm-2.5 mm, and the ratio of the width of the first lap-over area 25 to the width of the second lap-over area 26 falls in the range of 0.02-50.

In an embodiment of the stacking structure 20, in the first lap-over area 25, the pitch of the metal grid 231 is 0.1-10 times the pitch of the metal conducting wire 232.

In an embodiment of the stacking structure 20, the metal conducting wire 232 has pitch of 20 μm, line width of 10 μm and line spacing of 10 μm, and the pitch of the metal grid 231 in the first lap-over area 25 falls in the range of 2 μm-200 μm.

In an embodiment, in the first lap-over area 25, the line width falls in the range of 2 μm-50 μm, and the line spacing falls in the range of 2 μm-10 μm.

In an embodiment, the metal grid 231 in the first lap-over area 25 has line width/line spacing of 40 μm/10 μm, 30 μm/10 μm, 20 μm/10 μm or 10 μm/10 μm.

In an embodiment of the stacking structure 20, the metal conducting wire 232 has a line width of 3 μm-30 μm and line spacing of 3 μm-30 μm.

For instance, the stacking structure 20 of this embodiment is produced by the method of embodiment 1, but the present disclosure is not limited thereto.

Embodiment 3

FIG. 8, FIG. 9, FIG. 10, FIG. 11 and FIG. 12 are schematic views of a stacking structure 30 according to embodiment 3 of the present disclosure. Referring to FIG. 8, FIG. 9, FIG. 10, FIG. 11 and FIG. 12, the stacking structure 30 of this embodiment includes: a substrate 31 (not shown in FIG. 8); a catalyst layer 32 (not shown in FIG. 8) disposed on the substrate 31, wherein the catalyst layer 32 includes a grid pattern 321 and a conducting wire pattern 322 connected to the grid pattern 321; a metal layer 33 disposed on the catalyst layer 32, wherein the metal layer 33 includes a metal grid 331 correspondingly disposed on the grid pattern 321 of the catalyst layer 32 and a metal conducting wire 332 correspondingly disposed on the conducting wire pattern 322 of the catalyst layer 32; and a silver nanowire layer 34 disposed on the metal layer 33, wherein the silver nanowire layer 34 at least partially overlaps the metal grid 331.

The stacking structure 30 of this embodiment includes: a trace area TA in which the metal conducting wire 332 is disposed; a first lap-over area 35, including an area defined in the metal grid 331 but not covered with the silver nanowire layer 34; a second lap-over area 36, including an opaque region 37 defined in the metal grid 331 and covered with the silver nanowire layer 34 and a transparent region 38 positioned proximate to two opposing ends of the metal grid 331, covered with the silver nanowire layer 34, but not covered with the metal grid 331; and a visible area VA, including an area positioned proximate to one edge of the metal grid 331, covered with the silver nanowire layer 34, but not covered with the metal grid 331.

Compared with embodiment 2, this embodiment differs in that the stacking structure 30 further includes: a bonding pad 39 disposed on the substrate 31. The bonding pad includes: a bonding catalyst layer 32' disposed on the substrate 31, wherein the bonding catalyst layer 32' includes a bonding grid pattern 321'; a bonding metal layer 33' disposed on the bonding catalyst layer 32', wherein the bonding metal layer 33' includes a bonding metal grid 331' correspondingly disposed on the bonding grid pattern 321' of the bonding catalyst layer 32'.

In this embodiment, the bonding pad 39 functions as a contact for connection with an external circuit.

For instance, the stacking structure 30 of this embodiment is produced by the method of embodiment 1, but the present disclosure is not limited thereto. In this embodiment, both the catalyst layer 32 and the bonding catalyst layer 32' of the stacking structure 30 are printed in a single flexo plate printing step, and then both the metal layer 33 and the bonding metal layer 33' of the stacking structure 30 of this embodiment are plated in a single chemical plating step.

Embodiment 4

Figure 13:
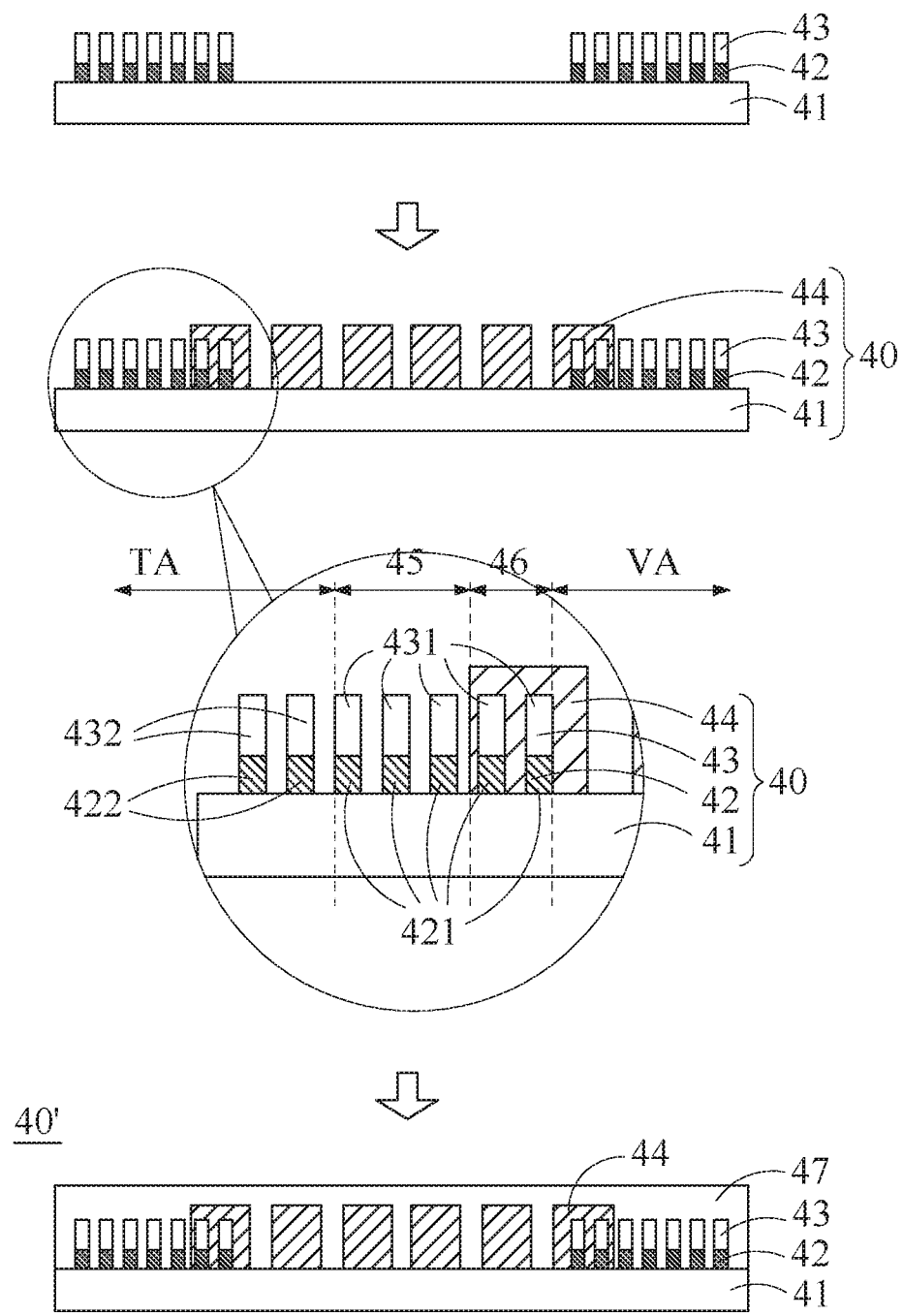
FIG. 13 is a schematic view of a touch sensor and the process flow of the method according to embodiment 4 of the present disclosure.

FIG. 13 is a schematic view of a touch sensor 40' and the process flow of the method according to embodiment 4 of the present disclosure. Referring to FIG. 13, the touch sensor 40' of this embodiment has the stacking structure 40 of embodiment 2.

The stacking structure 40 in the touch sensor 40' of this embodiment includes: a substrate 41; a catalyst layer 42 disposed on the substrate 41, wherein the catalyst layer 42 includes a grid pattern 421 and a conducting wire pattern 422 connected to the grid pattern 421; a metal layer 43 disposed on the catalyst layer 42, wherein the metal layer 43 includes a metal grid 431 correspondingly disposed on the grid pattern 421 of the catalyst layer 42 and a metal conducting wire 432 correspondingly disposed on the conducting wire pattern 422 of the catalyst layer 42; and a silver nanowire layer 44 disposed on the metal layer 43, wherein the silver nanowire layer 44 at least partially overlaps the metal grid 431.

The stacking structure 40 in the touch sensor 40' of this embodiment includes: a trace area TA in which the metal conducting wire 432 is disposed; a first lap-over area 45, including an area defined in the metal grid 431 but not covered with the silver nanowire layer 44; a second lap-over area 46, including an opaque region defined in the metal grid 431 and covered with the silver nanowire layer 44 and a transparent region positioned proximate to two opposing ends of the metal grid 431, covered with the silver nanowire layer 44, but not covered with the metal grid 431; and a visible area VA, including an area positioned proximate to one edge of the metal grid 431, covered with the silver nanowire layer 44, but not covered with the metal grid 431.

Compared with embodiment 2, this embodiment differs in that the touch sensor 40' further includes a covering layer 47 disposed on the silver nanowire layer 44.

Referring to FIG. 13, in this embodiment, the process flow of producing the touch sensor 40' includes the steps of: providing the substrate 41; printing, by flexography, the catalyst layer 42 onto the substrate 41, wherein the catalyst layer 42 includes the grid pattern 421 and the conducting wire pattern 422 connected to the grid pattern 421; plating, by chemical plating, the metal layer 43 onto the catalyst layer 42, wherein the metal layer 43 includes the metal grid 431 corresponding in position to the grid pattern 421 of the catalyst layer 42 and the metal conducting wire 432 corresponding in position to the conducting wire pattern 422 of the catalyst layer 42; printing, by flexography, the silver nanowire layer 44 onto the metal layer 43, wherein the silver nanowire layer 44 at least partially overlaps the metal grid 431; and providing the covering layer 47 on the silver nanowire layer 44.

Embodiment 5

Figure 14:
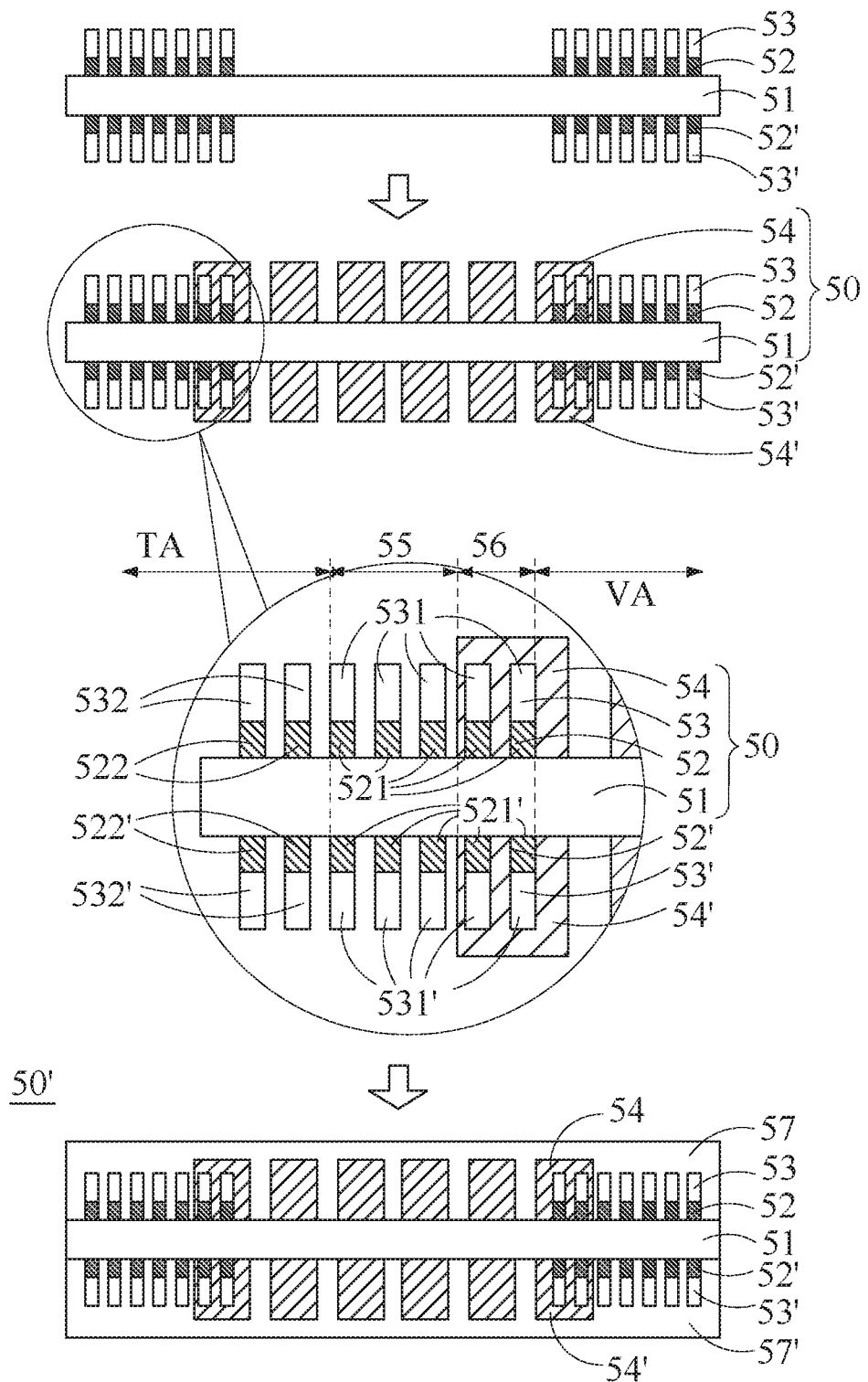
FIG. 14 is a schematic view of the touch sensor and the process flow of the method according to embodiment 5 of the present disclosure.

FIG. 14 is a schematic view of the touch sensor 50' and the process flow of the method according to embodiment 5 of the present disclosure. Referring to FIG. 14, the touch sensor 50' of this embodiment has the stacking structure 50 of embodiment 2.

The stacking structure 50 in the touch sensor 50' of this embodiment includes: a substrate 51; a catalyst layer 52 disposed on the substrate 51, wherein the catalyst layer 52 includes a grid pattern 521 and a conducting wire pattern 522 connected to the grid pattern 521; a metal layer 53 disposed on the catalyst layer 52, wherein the metal layer 53 includes a metal grid 531 correspondingly disposed on the grid pattern 521 of the catalyst layer 52 and a metal conducting wire 532 correspondingly disposed on the conducting wire pattern 522 of the catalyst layer 52; and a silver nanowire layer 54 disposed on the metal layer 53, wherein the silver nanowire layer 54 at least partially overlaps the metal grid 531.

The stacking structure 50 in the touch sensor 50' of this embodiment includes: a trace area TA in which the metal conducting wire 532 is disposed; a first lap-over area 55, including an area defined in the metal grid 531 but not covered with the silver nanowire layer 54; a second lap-over area 56, including an opaque region defined in the metal grid 531 and covered with the silver nanowire layer 54 and a transparent region positioned proximate to two opposing ends of the metal grid 531, covered with the silver nanowire layer 54, but not covered with the metal grid 531; and a visible area VA, including an area positioned proximate to one edge of the metal grid 531, covered with the silver nanowire layer 54, but not covered with the metal grid 531.

Unlike embodiment 2, this embodiment differs in that the touch sensor 50' further includes a covering layer 57 disposed on the silver nanowire layer 54.

Unlike embodiment 4, this embodiment differs in that the touch sensor 50' further includes: a second catalyst layer 52' disposed below the substrate 51, wherein the second catalyst layer 52' includes a second grid pattern 521' and a second conducting wire pattern 522' connected to the second grid pattern 521'; a second metal layer 53' disposed below the second catalyst layer 52', wherein the second metal layer 53' includes a second metal grid 531' correspondingly disposed below the second grid pattern 521' of the second catalyst layer 52' and a second metal conducting wire 532' correspondingly disposed below the second conducting wire pattern 522' of the second catalyst layer 52'; a second silver nanowire layer 54' disposed below the second metal layer 53', wherein the second silver nanowire layer 54' at least partially overlaps the second metal grid 531'; and a second covering layer 57' disposed below the second silver nanowire layer 54'.

As shown in FIG. 14, an exemplary process flow of producing the touch sensor 50' of this embodiment includes the steps of: providing the substrate 51; printing, by flexography, the catalyst layer 52 and the second catalyst layer 52' onto two sides of the substrate 51 simultaneously, wherein the catalyst layer 52 includes the grid pattern 521 and the conducting wire pattern 522 connected to the grid pattern 521, and the second catalyst layer 52' includes the second grid pattern 521' and the second conducting wire pattern 522' connected to the second grid pattern 521'; plating, by chemical plating, the metal layer 53 onto the catalyst layer 52 from above and the second metal layer 53' onto the second catalyst layer 52' from below, wherein the metal layer 53 includes the metal grid 531 corresponding in position to the grid pattern 521 of the catalyst layer 52 and the metal conducting wire 532 corresponding in position to the conducting wire pattern 522 of the catalyst layer 52, wherein the second metal layer 53' includes the second metal grid 531' corresponding in position to the second grid pattern 521' of the second catalyst layer 52' and the second metal conducting wire 532' corresponding in position to the second conducting wire pattern 522' of the second catalyst layer 52'; printing, by flexography, the silver nanowire layer 54 onto the metal layer 53 from above and the second silver nanowire layer 54' onto the second metal layer 53' from below, wherein the silver nanowire layer 54 at least partially overlaps the metal grid 531, and the second silver nanowire layer 54' at least partially overlaps the second metal grid 531'; and providing the covering layer 57 on the silver nanowire layer 54 and the second covering layer 57' below the second silver nanowire layer 54'.

In conclusion, according to the present disclosure, a method of producing a stacking structure, the stacking structure and a touch sensor at least have the following advantages:

According to the present disclosure, the method of producing a stacking structure involves printing a catalyst layer by flexography, plating a metal layer by chemical plating, and printing a silver nanowire layer by flexography, thereby dispensing with any conventional lithography and etching processes, which are intricate and expensive. Therefore, the method of producing a stacking structure is simple and conducive to reduction of the production cost of the stacking structure. The method of producing a stacking structure is applicable to a touch sensor process and thus conducive to reduction of the production cost of the touch sensor including the stacking structure.

According to the present disclosure, the metal layer of the stacking structure includes a metal grid, such that the stacking structure and the touch sensor including the stacking structure have unique stacking designs in the first lap-over area and second lap-over area. Compared with conventional metal sheets, the metal grid of the present disclosure requires less metallic raw materials and thus reduces the production cost of the stacking structure and the touch sensor including the stacking structure, so as to attain a square touch sensor.

While the present disclosure has been described by means of specific embodiments, numerous modifications and variations could be made thereto by those skilled in the art without departing from the scope and spirit of the present disclosure set forth in the claims.

What is claimed is:

1. A stacking structure, comprising:
    a substrate;
    a catalyst layer disposed on the substrate, wherein the catalyst layer comprises a grid pattern and a conducting wire pattern connected to the grid pattern;
    a metal layer disposed on the catalyst layer, wherein the metal layer comprises a metal grid correspondingly disposed on the grid pattern of the catalyst layer and a metal conducting wire correspondingly disposed on the conducting wire pattern of the catalyst layer;
    a silver nanowire layer disposed on the metal layer, wherein the silver nanowire layer at least partially overlaps the metal grid and is disposed laterally between a sidewall of a first element of the metal grid and a sidewall of a second element of the metal grid;
    a trace area in which the metal conducting wire is disposed;
    a first lap-over area comprising an area defined in the metal grid but not covered with the silver nanowire layer;
    a second lap-over area comprising an opaque region defined in the metal grid and covered with the silver nanowire layer and a transparent region positioned proximate to two opposing edges of the metal grid, covered with the silver nanowire layer, but not covered with the metal grid; and
    a visible area comprising an area positioned proximate to an edge of the metal grid, covered with the silver nanowire layer, but not covered with the metal grid.

2. The stacking structure of claim 1, wherein the catalyst layer comprises at least one of catalytic metal wires, metal particles, metal ions, or metal sheets.

3. The stacking structure of claim 1, wherein the catalyst layer comprises at least one of acrylate or epoxy resin.

4. The stacking structure of claim 1, wherein the metal layer comprises at least one of copper, copper-nickel alloy, copper-lead alloy, silver, silver-nickel alloy or silver-lead alloy.

5. The stacking structure of claim 1, wherein the substrate comprises at least one of polyethylene terephthalate (PET), cyclic olefin copolymer (COP), colorless polyimide (CPI), polyethylene naphthalate (PEN), polycarbonate (PC) or polyethersulfone (PES).

6. The stacking structure of claim 1, wherein the silver nanowire layer has a thickness greater than 0.3 μm.

7. The stacking structure of claim 1, wherein the transparent region accounts for a smaller proportion of the second lap-over area than the opaque region, and the transparent region accounts for less than 50% of an overlap part of the silver nanowire layer and the metal grid.

8. The stacking structure of claim 1, wherein a total width of the first lap-over area and the second lap-over area is less than 500 μm, and a ratio of a width of the first lap-over area to a width of the second lap-over area falls in a range of 0.1-10.

9. The stacking structure of claim 1, wherein a total width of the first lap-over area and the second lap-over area falls in a range of 0.5 mm-1.0 mm, and a ratio of a width of the first lap-over area to a width of the second lap-over area falls in a range of 0.05-20.

10. The stacking structure of claim 1, wherein a total width of the first lap-over area and the second lap-over area falls in a range of 1.0 mm-1.5 mm, and a ratio of a width of the first lap-over area to a width of the second lap-over area falls in a range of 0.03-30.

11. The stacking structure of claim 1, wherein a total width of the first lap-over area and the second lap-over area falls in a range of 1.5 mm-2.5 mm, and a ratio of a width of the first lap-over area to a width of the second lap-over area falls in a range of 0.02-50.

12. The stacking structure of claim 1, wherein, in the first lap-over area, a pitch of the metal grid is 0.1-10 times a pitch of the metal conducting wire.

13. The stacking structure of claim 1, wherein the metal conducting wire has a pitch of 20 μm, a line width of 10 μm, and a line spacing of 10 μm, and the metal grid in the first lap-over area has a pitch of 2 μm-200 μm.

14. The stacking structure of claim 13, wherein the metal grid in the first lap-over area has a line width of 2 μm-50 μm and a line spacing of 2 μm-10 μm.

15. The stacking structure of claim 14, wherein the metal grid in the first lap-over area has a line width/line spacing of 40 μm/10 μm, 30 μm/10 μm, 20 μm/10 μm or 10 μm/10 μm.

16. The stacking structure of claim 1, wherein the metal conducting wire has a line width of 3 μm-30 μm and line spacing of 3 μm-30 μm.

17. The stacking structure of claim 1, further comprising:
    a bonding pad disposed on the substrate, comprising:
        a bonding catalyst layer disposed on the substrate, wherein the bonding catalyst layer comprises a bonding grid pattern; and
        a bonding metal layer disposed on the bonding catalyst layer, wherein the bonding metal layer comprises a bonding metal grid correspondingly disposed on the bonding grid pattern of the bonding catalyst layer.

18. A touch sensor, comprising:
    the stacking structure of claim 1; and
    a covering layer disposed on the silver nanowire layer of the stacking structure.

19. The touch sensor of claim 18, further comprising:
a second catalyst layer disposed below the substrate in the stacking structure, wherein the second catalyst layer comprises a second grid pattern and a second conducting wire pattern connected to the second grid pattern;
a second metal layer disposed below the second catalyst layer, wherein the second metal layer comprises a second metal grid correspondingly disposed below the second grid pattern of the second catalyst layer and a second metal conducting wire correspondingly disposed below the second conducting wire pattern of the second catalyst layer;
a second silver nanowire layer disposed below the second metal layer, wherein the second silver nanowire layer at least partially overlaps the second metal grid; and
a second covering layer disposed below the second silver nanowire layer.

* * * * *